US006198993B1

(12) United States Patent
Higashi et al.

(10) Patent No.: US 6,198,993 B1
(45) **Date of Patent: *Mar. 6, 2001**

(54) RUNNING VEHICLE CONTROL METHOD FOR AUTOMATICALLY CONTROLLING A PLURALITY OF VEHICLES RUNNING ON A ROAD

(75) Inventors: Shinichi Higashi; Shinichi Matsumoto; Hiroshi Saeki; Syuuichi Takemoto, all of Mihara (JP)

(73) Assignee: Mitsubishi Heavy Industries, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/130,019

(22) Filed: Aug. 6, 1998

(30) Foreign Application Priority Data

Aug. 22, 1997 (JP) .................................................. 9-226421

(51) Int. Cl.[7] .................................................... G01C 22/00

(52) U.S. Cl. ........................... 701/23; 701/301; 180/168; 104/292; 104/295; 104/298; 246/182 R; 246/187 B; 246/167 R

(58) Field of Search ............................... 701/23, 26, 300, 701/301; 104/292, 295, 299, 300, 301, 298; 246/182 R, 187 R, 3, 4, 6, 182 B, 182 C, 187 A, 187 C, 187 B, 167 R

(56) References Cited

U.S. PATENT DOCUMENTS 3,796,871 3/1974 Helmcke et al. .
3,874,301 * 4/1975 Alimanestianu ..................... 104/152
3,941,201 3/1976 Herman et al. .
5,116,002 * 5/1992 Veraart ............................. 246/187 R
5,127,599 * 7/1992 Veraart ............................. 246/182 R
5,761,630 * 6/1998 Sekine et al. ........................ 701/301

FOREIGN PATENT DOCUMENTS 1943596A 3/1971 (DE) .
1305019A 1/1973 (GB) .
9814359A 4/1998 (WO) .

OTHER PUBLICATIONS

Thomas T H: "Control techniques for PRT," Railway Gazette International, Jan. 1974, UK, vol. 130, No. 1, pp. 15–17.

* cited by examiner

*Primary Examiner*—Jacques H. Louis-Jacques

(57) ABSTRACT

An adjacent vehicle approach prohibition region is set before and after a to-be-converged moving target (MT) on a main line with reference to the to-be-converged MT. The to-be-converged MT corresponds to a converging MT assigned to a converging vehicle which is about to enter and converge onto the main line from a branch line. When a preceding non-MT-controlled vehicle or a following non-MT-controlled vehicle, which is a to-be-converged vehicle running on the main line onto which the converging vehicle is to converge, and which preceding or following vehicle is not subjected to a control by a MT method, has entered the adjacent vehicle approach prohibition region, the to-be-converged MT is accelerated/decelerated, whereby the entering to-be-converged vehicle is excluded from the adjacent vehicle approach prohibition region.

7 Claims, 6 Drawing Sheets

RUNNING VEHICLE CONTROL METHOD FOR AUTOMATICALLY CONTROLLING A PLURALITY OF VEHICLES RUNNING ON A ROAD

BACKGROUND OF THE INVENTION

The present invention relates to a running vehicle control method for automatically controlling a plurality of vehicles running on a road.

A moving target method (hereinafter referred to as "MT method") is conventionally known as one of running vehicle control methods for automatically controlling vehicles running on a road.

In the MT method, as shown in FIG. 1, a virtual road 82 equivalent to a real road 81 is set on a driving management computer (not shown). Points (moving targets (MT)) 83 for ideal running are set at predetermined intervals on the virtual road 82, and actual vehicles are controlled to run on the real road 1 in pursuit of the MT 83.

An example of the system, to which the MT method is applied, will now be described with reference to FIGS. 2 and 3.

In FIG. 2, a road 90 comprises a looped main line 91 and at least one (three in FIG. 2) branch line arranged at a predetermined interval. The branch line 92 diverges from the main line 91 to a stop point 99 at which the vehicle stops/starts and converges to the main line 91 from the stop point 99.

As shown in FIGS. 2 and 3, the road 90 is provided with communication/position information equipment units 95 for performing communications with the running vehicles, controlling the vehicles, and acquiring position information on the vehicles. The vehicles are regularly driven according to MT signals generated from the equipment units 95 under control of the driving management computer.

The vehicle, which has advanced after temporarily stopping the stop point 99 on the branch line 92, enters an acceleration region 96 shown in FIG. 3. In order to make the vehicle (converging vehicle) on the branch line 92, which has entered the acceleration region 96 from the stop point 99, converge onto the main line 91, the following techniques are conventionally adopted. In one technique, the vehicle is started from the stop point in such a timing that the vehicle can timely catch the MT on the main line at a convergence point 94 (this MT on the main line being called "to-be-converged MT"). In another technique, all MTs assigned to the vehicles on the main line 91 are shifted so that the MT ("converging MT") on the branch line 92 can be assigned to the vehicle on the branch line 92 advancing to converge onto the convergence point 94.

Recently, with an increase in amount of transportation, there is an increasing demand for high-density running of vehicles.

However, the conventional running vehicle control method, to which the MT method is applied, is not suitable to the high-density running control system. If the conventional MT method is applied to the high-density running control system with no changes, the following problems will arise:

1) The vehicle, which runs before or after the to-be-converged MT on the main line 91 corresponding to the converging MT assigned to the vehicle on the branch line to be converged or runs on a main line of another traffic lane, is not necessarily subjected to the MT control. Thus, the safety for the convergence is not ensured.

2) When the MTs generated at predetermined intervals are used, the position of the to-be-converged MT is not necessary optimal in consideration of the vehicle run condition (e.g. traffic volume) on the true road. Thus, the safety for the convergence is not ensured.

The object of the present invention is to provide a running vehicle control method ensuring high safety for convergence/divergence of vehicles.

BRIEF SUMMARY OF THE INVENTION

In order to achieve the above object, the present invention provides a first running vehicle control method, wherein an adjacent vehicle approach prohibition region is set before and after a to-be-converged MT on a main line with reference to the to-be-converged MT, the to-be-converged MT corresponding to a converging MT assigned to a converging vehicle which is about to enter and converge onto the main line from a branch line; and in a case where a to-be-converged vehicle running on the main line, onto which the converging vehicle is to converge, has entered the adjacent vehicle approach prohibition region and the entering to-be-converged vehicle is a vehicle not subjected to a control by a MT method, the to-be-converged moving target is accelerated/decelerated, whereby the entering to-be-converged vehicle is excluded from the adjacent vehicle approach prohibition region.

The present invention provides a second running vehicle control method, wherein with respect to at least one of a converging MT assigned to a converging vehicle and a to-be-converged MT assigned to a to-be-converged vehicle running on a main line onto which the converging vehicle is to converge, at least one of an interval of generation of the moving target and a speed of movement of the moving target is varied in accordance with a vehicle run condition on the main line.

In the first running vehicle control method, the adjacent vehicle approach prohibition region is set before and after the to-be-converged MT on the main line with reference to the to-be-converged MT, the to-be-converged MT corresponding to the converging MT assigned to the converging vehicle. Since, in the MT method, the to-be-converged MT and the converging MT corresponding to the to-be-converged MT are moved in synchronism with each other, setting the approach prohibition region before and after the to-be-converged MT is equivalent to setting the approach prohibition region before and after the converging MT.

The approach prohibition region functions to prohibit the entering of the to-be-converged vehicle onto which the converging vehicle is to converge, thereby keeping a safe inter-vehicle distance from the to-be-converged vehicle. If the to-be-converged vehicle, e.g. a vehicle preceding the to-be-converged MT, a vehicle following the to-be-converged MT or a other-lane running vehicle which has changed its lane from some other lane to the same lane as the to-be-converged MT, has entered the approach prohibition region, the entering vehicle (incoming vehicle) needs to be excluded from the approach prohibition region.

In a case where the incoming vehicle is a vehicle (MT-controlled vehicle) subjected to a control by the MT method, the MT assigned to the vehicle is controlled to directly exclude the vehicle from the approach prohibition region. However, if the incoming vehicle is a vehicle (non-MT-controlled vehicle) not subjected to the control by the MT method, this method cannot be applied.

In the case where the incoming vehicle is the non-MT-controlled vehicle, the to-be-converged MT is accelerated or decelerated, that is, the to-be-converged MT is shifted. Thus, the approach prohibition region set with reference to the to-be-converged MT is shifted. By adopting this method, the incoming vehicle is excluded from the prohibition region by relative shift.

Since the to-be-converged vehicle, which has come in the approach prohibition region, is excluded from the approach prohibition region, a safe inter-vehicle distance can be kept at the convergence point between the to-be-converged MT and the preceding/following to-be-converged vehicle. That is, a safe inter-vehicle distance can be kept between the converging vehicle and the preceding/following to-be-converged vehicle, and the converging vehicle can be safely converged.

If the length (along the main line) of the approach prohibition region is dynamically determined in accordance with the vehicle run conditions on the main line, such as a vehicle traffic volume of vehicles running on the main line, a vehicle speed, a road condition and a vehicle performance, a safe optimal inter-vehicle distance can be kept between the to-be-converged MT (converging vehicle) and the preceding/following to-be-converged vehicle, without unnecessarily increasing the inter-vehicle distance. Specifically, when the length of the approach prohibition region is determined in relation to the vehicle speed, the length is increased in accordance with the vehicle speed.

The above-described method of keeping the safe inter-vehicle distance between the converging vehicle and the preceding/following to-be-converged vehicle by excluding the incoming to-be-converged vehicle from the approach prohibition region is similarly effective on the diversion from the main line to the branch line.

In the second running vehicle control method, with respect to the converging MT assigned to the converging vehicle and/or the to-be-converged MT assigned to the to-be-converged vehicle is to converge, the interval of generation of the MT and/or the speed of movement of the MT is varied in accordance with vehicle run conditions such as a vehicle traffic volume of vehicles running on the main line, a vehicle speed, a road condition and a vehicle performance. In other words, the converging MT or to-be-converged MT is set as variable MT having the convergence point as the point of change.

Accordingly, the safety of the converging vehicle is ensured, and traffic accidents in the diverging/ converging region can be prevented. Furthermore, since the non-busy MT close to the converging vehicle can be used as the converging MT, the wait time for the converging MT is not required or is reduced to a minimum. Disorders due to wait time, such as traffic snarl, can be remarkably reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the accompanying drawings.

Figure 4:
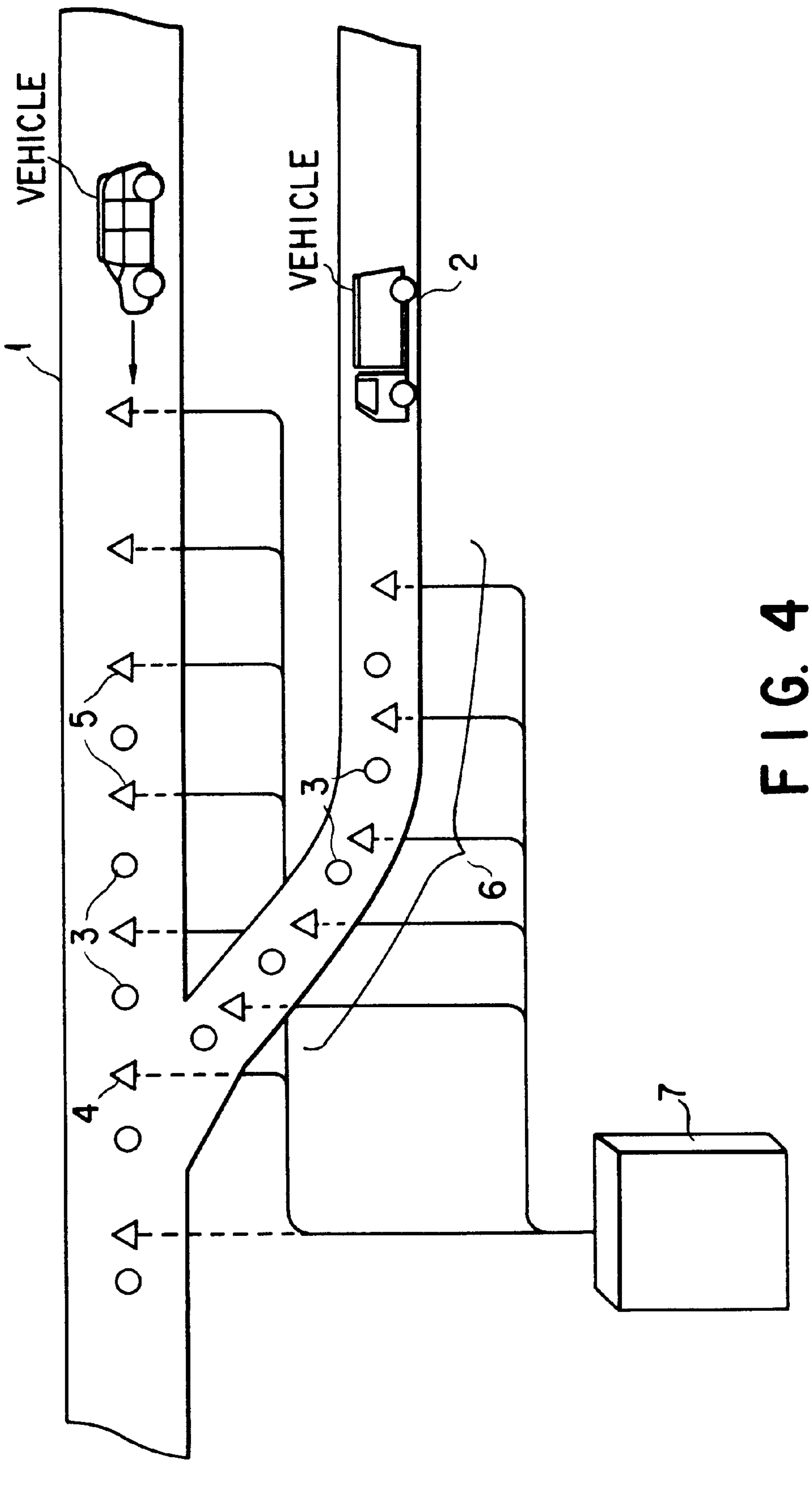
FIG. 4 shows a schematic structure of a system to which a running vehicle control method according to an embodiment of the invention is applied.

FIG. 4 shows a schematic structure of a system, to which a running vehicle control method according to an embodiment of the invention, is applied.

This system adopts an MT method and, as shown in FIG. 4, has a structure necessary for assigning MTs 3 to vehicles by detecting the positions of the vehicles on roads (main line 1 and branch line 2). Specifically, the section of the present system, which relates to the MT method, comprises communication/position information equipment units 5 (provided on the roads) for performing communications with the vehicles running on the roads, controlling the vehicles and acquiring position information on the vehicles, and a driving management computer 7 for managing and controlling the vehicles (in particular, a control for assigning MTs to the running vehicles through the equipment units 5) on the basis of the position information detected by the equipment units 5. In this case, in the normal state, the MTs 3 are ideally provided at predetermined intervals on virtual roads equivalent to real roads (main line 1 and branch line 2) by the control of the driving management computer 7.

In FIG. 4, the branch line 2 on the convergence point (4) side is provided with an acceleration region 6 for the vehicle which is about to enter and converge onto the main line 1 from the branch line 2. If the vehicle has entered the acceleration region 6, the vehicle is accelerated in accordance with the MTs (converging MTs) assigned to the vehicle and controlled to converge onto the main line 1 at the convergence point 4.

Figure 1:
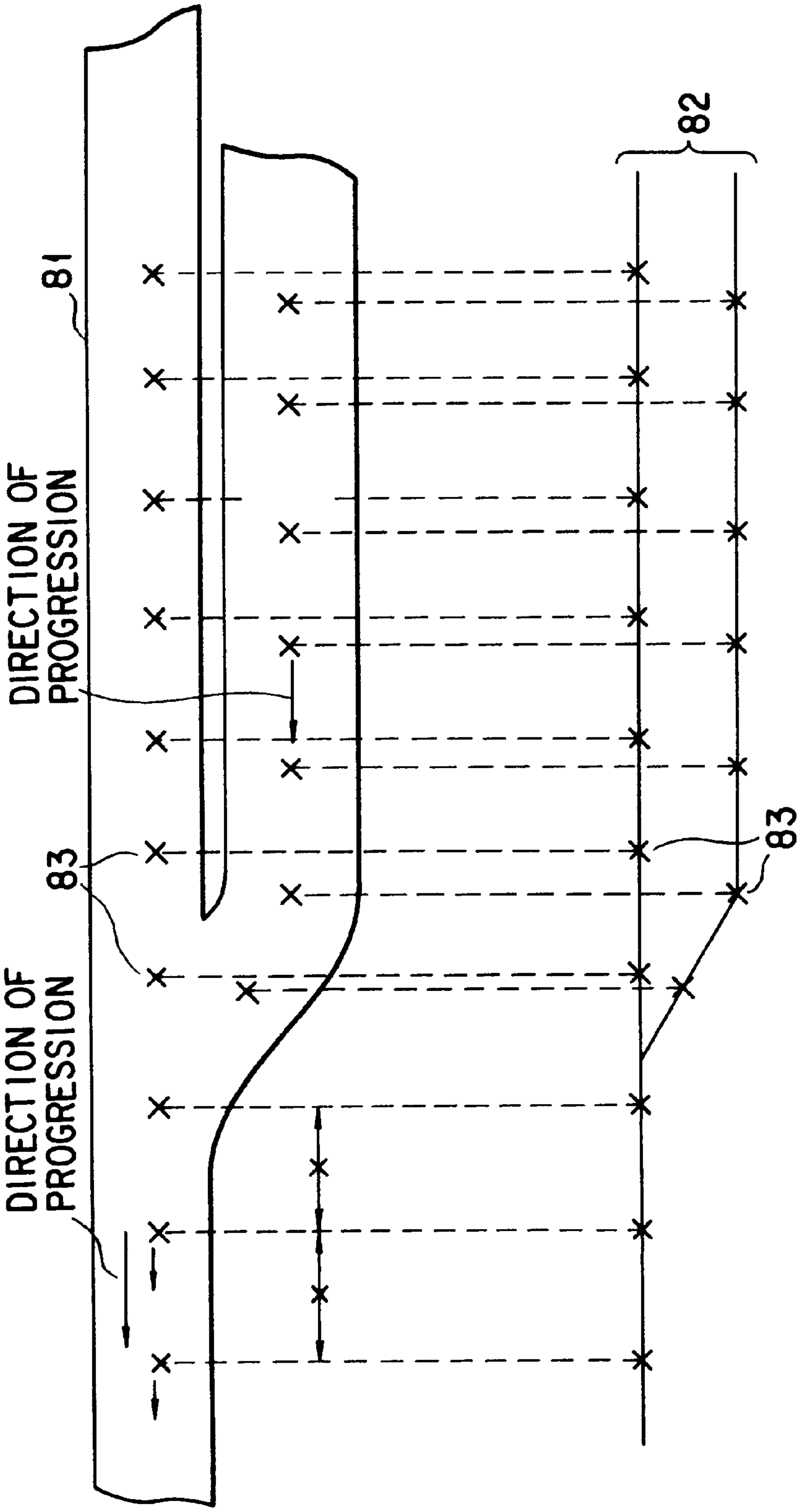
FIG. 1 (PRIOR ART)
FIG. 1 is a conceptual view for describing an MT method.
Figure 2:
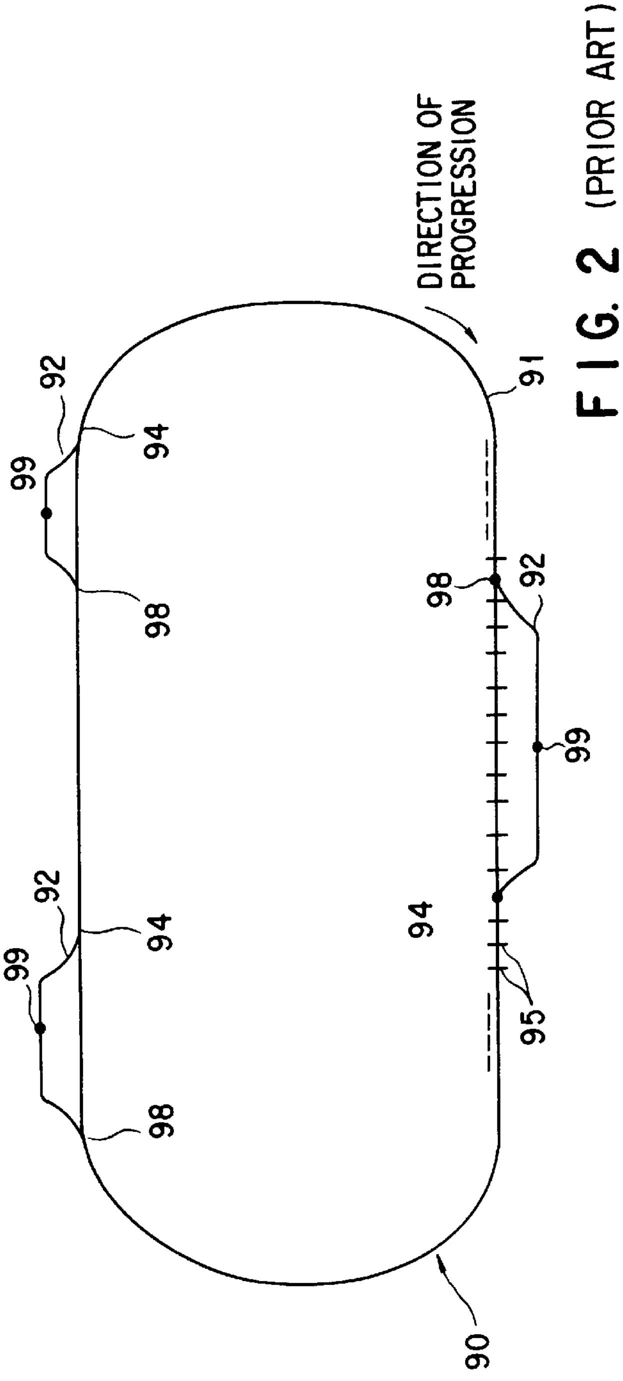
FIG. 2 (PRIOR ART)
FIG. 2 shows an example of a system to which a conventional MT method is applied.
Figure 3:
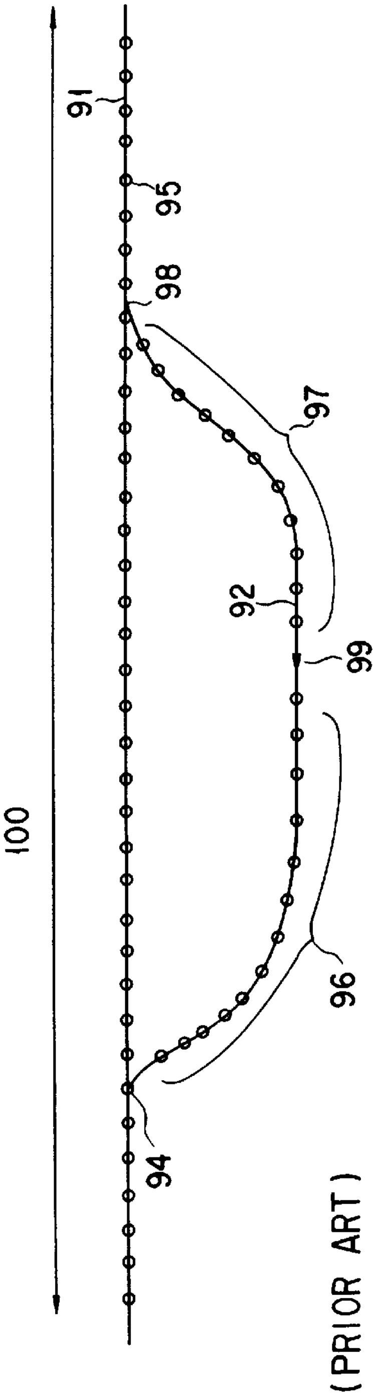
FIG. 3 (PRIOR ART)
FIG. 3 shows in detail the regions of divergence/ convergence points between the main line and branch line in the system shown in FIG. 2.

Although FIG. 4 shows only the case of convergence for the purpose of simple description, the basic structure for divergence is substantially the same. In the case of the divergence, the convergence in this embodiment is replaced with divergence, the acceleration region with a deceleration region, and the acceleration with deceleration. For example, where the vehicle diverges from the main line 1 to branch line 2, a deceleration region (corresponding to the deceleration region 97 in FIG. 3), instead of the deceleration region, is provided on the branch line 2 on the divergence point side (corresponding to the divergence point 98 in FIG. 3). The vehicle is diverged according to the diverging MT and decelerated in the deceleration region.

The running vehicle control operation of the system having the structure shown in FIG. 4 will now be described with reference to FIGS. 5 to 7.

Suppose that, in FIG. 4, the vehicle (converging vehicle), which is about to enter and converge onto the main line 1 from branch line 2, has entered the acceleration region 6. One of MTs 3 moving on the branch line 2 (a virtual road equivalent to the branch line 2, which is set on the driving management computer 7 in FIG. 4) is assigned to the converging vehicle as the converging MT. In this case, the MT 3 corresponding to the converging MT, which moves on the main line 1 (a virtual road equivalent to the true road 1, which is set on the driving management computer 7 in FIG. 4) is set as a to-be-converged MT 30. The converging MT is synchronized with the to-be-converged MT.

Figure 5:
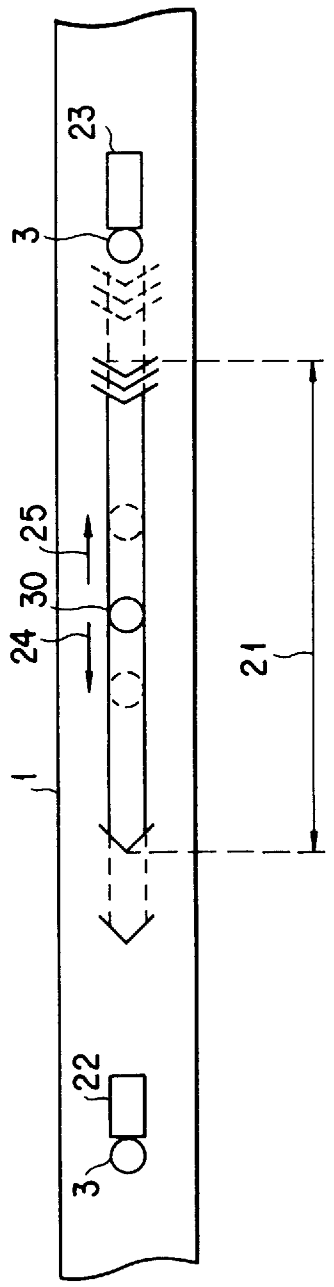
FIG. 5 illustrates a concept of an adjacent vehicle approach prohibition region applied to the system of FIG. 4, and a concept of excluding a preceding non-MT-controlled vehicle and a following non-MT-controlled vehicle from this prohibition region.

On the driving management computer 7, as shown in FIG. 5, an adjacent vehicle approach prohibition region 21, extending in front of and behind the to-be-converged MT 30, is provided, with the position of the to-be-converged MT 30 as a reference position. The adjacent vehicle approach prohibition region 21 is provided to prevent other vehicle (to-be-converged vehicle) from entering therein, thus ensuring safety. The length of the region 21 (in the longitudinal direction of main line 1) is determined on the basis of the vehicle run conditions on the main line 1, such as a traffic volume, a vehicle speed, a road condition of main line 1, and vehicle performance. For example, in a case where the length of the approach prohibition region is to be set according to the vehicle speed, it should suffice if the length is increased as the vehicle speed increases.

In a case where a vehicle 22 preceding the to-be-converged MT 30 and/or a vehicle 23 following the to-be-converged MT 30 to-be-converged is an MT-controlled vehicle (MT-controlled, to-be-converged vehicle), the driving management computer 7 controls the MT 3 assigned to the MT-controlled vehicle. Thereby, the MT-controlled vehicle is prevented from entering the adjacent vehicle approach prohibition region 21 and the safety is ensured. Thus, the converging vehicle can converge onto the main line 1 from branch line 2 without colliding with the to-be-converged vehicle. As stated above, in the case where the to-be-converged vehicle 22 or 23 is the MT-controlled vehicle, the MT 3 assigned to this vehicle can be controlled and the vehicle can easily be prevented from entering the adjacent vehicle approach prohibition region 21.

On the other hand, in a case where the to-be-converged vehicle (the preceding vehicle 22 and/or following vehicle 23) is a non-MT-controlled vehicle, the above control cannot be applied. FIG. 5 shows an example wherein the preceding vehicle 22 of to-be-converged MT 30 is a non-MT-controlled vehicle (preceding non-MT-controlled vehicle) and also the following vehicle 23 of to-be-converged MT 30 is a non-MT-controlled vehicle (following non-MT-controlled vehicle).

When the preceding non-MT-controlled vehicle 22 or following non-MT-controlled vehicle 23 has entered the adjacent vehicle approach prohibition region 21, the driving management computer 7 accelerates or decelerates the to-be-converged MT 30 to effect a forward shift 24 or a rearward shift 25 of the to-be-converged MT 30. That is, the adjacent vehicle approach prohibition region 21 provided with reference to the to-be-converged MT 30 is shifted. Thus, the preceding non-MT-controlled vehicle 22 or following non-MT-controlled vehicle 23 is excluded from the prohibition region 21 by the relative shift of the MT 30, and the safety is ensured.

Figure 6:
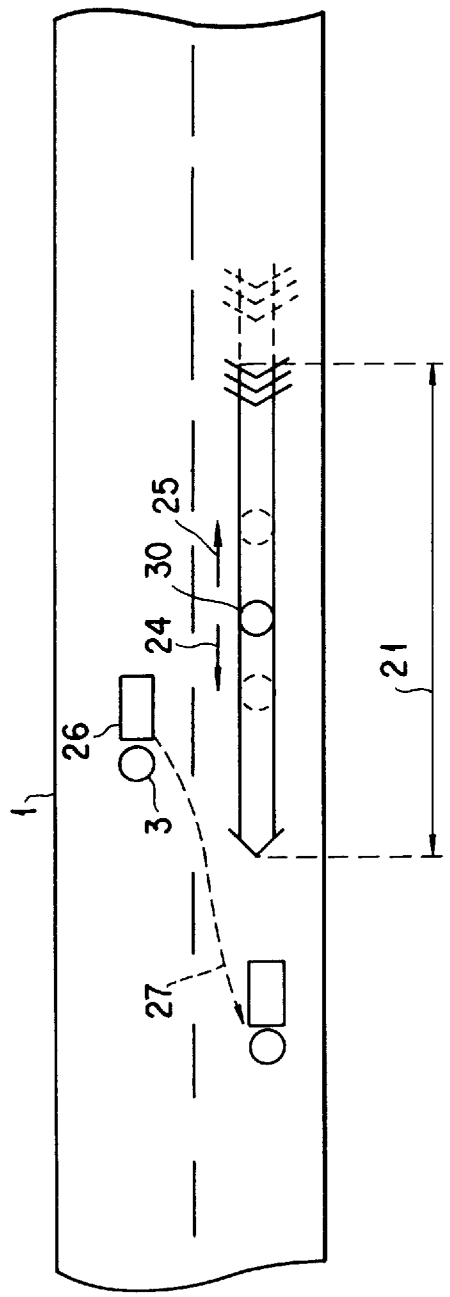
FIG. 6 illustrates a concept of excluding a non-MT-controlled vehicle of another traffic lane from the adjacent vehicle approach prohibition region.

FIG. 6 shows a running vehicle control operation in a case where the main line 1 has a plurality of traffic lanes and a vehicle 26 (other-lane running vehicle) running on a lane other than a lane on which the adjacent vehicle approach prohibition region 21 is set is to change its lane to the lane with the prohibition region 21.

When the other-lane running vehicle is an MT-controlled vehicle, the MT 3 assigned to the vehicle 26 can be controlled and thus the vehicle 26 can easily be prevented from entering the adjacent vehicle approach prohibition region 21 when it changes its traffic lane.

On the other hand, when the other-lane running vehicle 26 is a non-MT-controlled vehicle, the above-mentioned control cannot be applied.

When the other-lane running vehicle 26 is a non-MT-controlled vehicle (other-lane running non-MT-controlled vehicle), as shown in FIG. 6, and the non-MT-controlled vehicle 26 has entered the adjacent vehicle approach prohibition region 21 because of traffic lane change 26, the driving management computer 7 accelerates or decelerates the to-be-converged MT 30 to effect a forward shift 24 or a rearward shift 25 of the to-be-converged MT 30, similarly with the above case of FIG. 5 where the preceding non-MT-controlled vehicle 22 has entered the adjacent vehicle approach prohibition region 21. Thus, non-MT-controlled vehicle 26 is excluded from the prohibition region 21 by the relative shift of the MT 30 and the safety is ensured.

A specific example of exclusion of a to-be-converged vehicle from the adjacent vehicle approach prohibition region 21 will now be described with reference to FIG. 7. In this example, a following vehicle 23 (following to-be-converged vehicle) of to-be-converged MT 30 is a non-MT-controlled vehicle (following non-MT-controlled vehicle) and this non-MT-controlled vehicle 23 has entered the prohibition region 21. In this example, the MT (converging MT) 3, corresponding to the to-be-converged MT 30 in FIG. 5, is referred to as MT (converging MT) 31, as shown in FIG. 7, in order to distinguish this MT from other MTs, and the vehicle (converging vehicle), to which the MT 31 is assigned is referred to as a vehicle (converging vehicle) 41.

Figure 7:
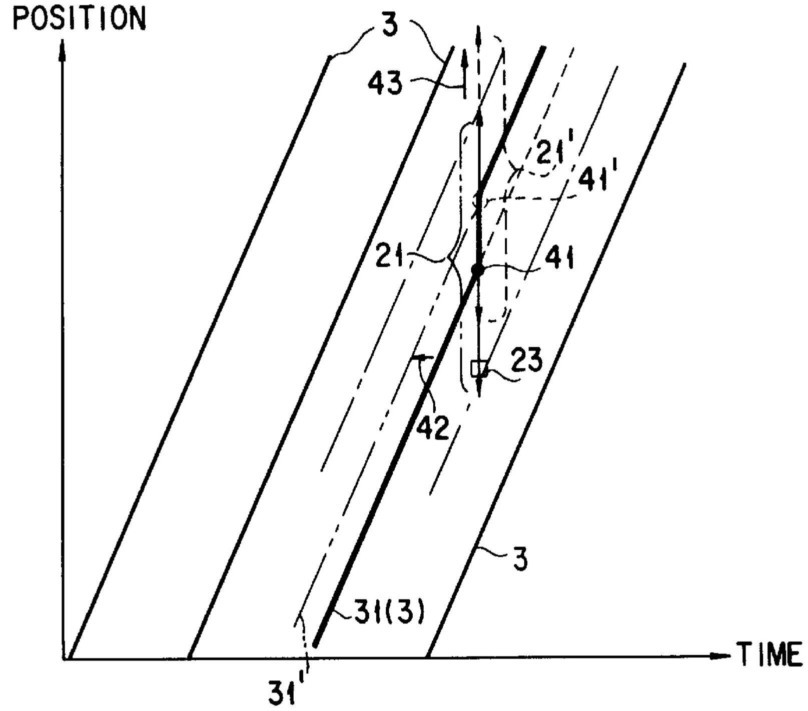
FIG. 7 illustrates an example of the method of excluding the following non-MT-controlled vehicle (the following non-MT-controlled to-be-converged vehicle) which has entered the adjacent vehicle approach prohibition region.

Suppose that the following vehicle 23 (following to-be-converged vehicle) of to-be-converged MT 30 in FIG. 5, i.e. the following non-MT-controlled vehicle (following non-MT-controlled to-be-converged vehicle) 23, has entered a rear portion of the adjacent vehicle approach prohibition region 21, as shown in FIG. 7.

In this case, in order to exclude the following non-MT-controlled vehicle 23 from the adjacent vehicle approach prohibition region 21, it should suffice to shift the to-be-converged MT 30 in the forward direction, as is clear from the above description. The to-be-converged MT 30 and the converging MT 31, corresponding to the to-be-converged MT 30, are moved in synchronism with each other. Accordingly, moving the to-be-converged MT 30 forward is equivalent to moving the converging MT 31 to the left, as shown in FIG. 7 by arrow 42. The converging MT 31, which has been shifted, is referred to as "converging MT 31'" for distinction from the converging MT 31 before the shift.

As a result of the shift of the converging MT 31 (to-be-converged MT 30), the adjacent vehicle approach prohibition region 21 is shifted upward (i.e. forward of main line 1) in FIG. 7 as indicated by arrow 43. The approach prohibition region 21, thus moved, is referred to as "adjacent vehicle approach prohibition region 21'".

If the adjacent vehicle approach prohibition region 21 moves upward and becomes the adjacent vehicle approach prohibition region 21', the following non-MT-controlled vehicle (following non-MT-controlled to-be-converged vehicle) 23 is excluded from the adjacent vehicle approach prohibition region 21'. Thus, the converging MT 31' is the converging MT after exclusion of the to-be-converged vehicle 23 (the following non-MT-controlled vehicle). The adjacent vehicle approach prohibition region 21' may be referred to as the adjacent vehicle approach prohibition region after exclusion of the to-be-converged vehicle. Similarly, the adjacent vehicle approach prohibition region 21 may be referred to as the adjacent vehicle approach prohibition region before exclusion of the to-be-converged vehicle. In addition, FIG. 7 shows the state wherein the converging MT 31 has shifted to become the converging MT 31' and, as a result, the converging vehicle 41 (before exclusion of the to-be-converged vehicle) has moved, following the MT 31', to become the converging vehicle 41' (after exclusion of the to-be-converged vehicle).

In the above-described case, the adjacent vehicle approach prohibition region 21, extending in front of and behind the to-be-converged MT 30, is set to enable the converging vehicle, which is about to proceed and converge onto the main line 1 from the branch line 3, to converge with safety without collision with the preceding or following vehicle of the to-be-converged MT 30 on the associated main line 1. However, the adjacent vehicle approach prohibition region 21 is not necessarily required.

Figure 8:
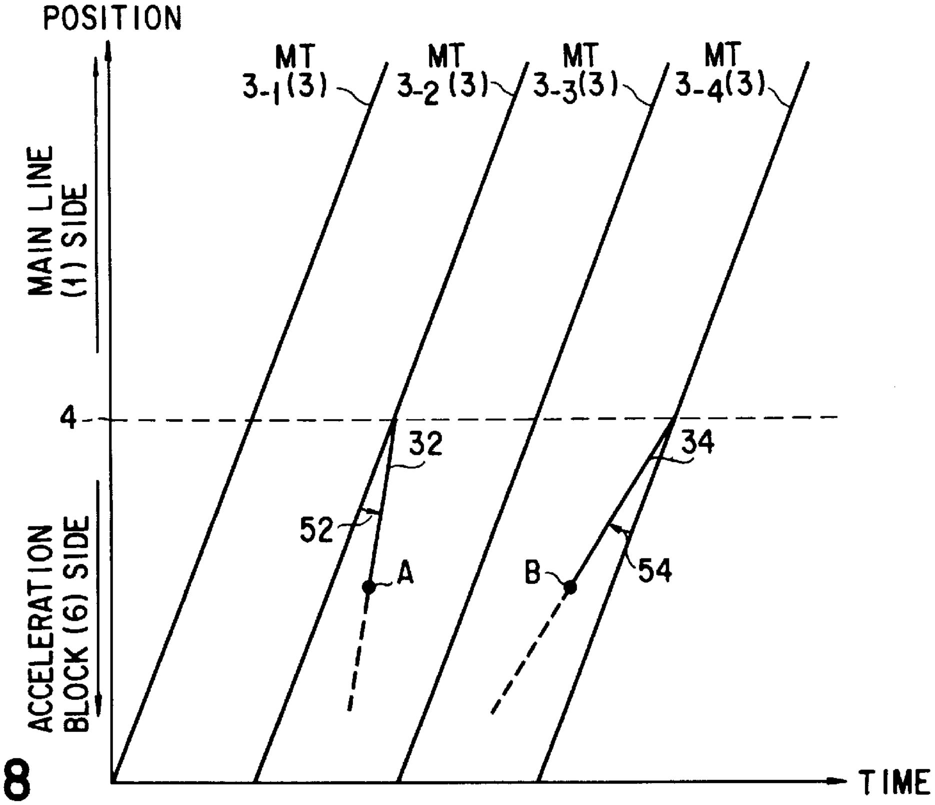
FIG. 8 illustrates a principle of an MT control to which variable MTs are applied.

Referring now to FIG. 8, a description will be given of the running vehicle control operation in the case where, in the system shown in FIG. 4, the converging vehicle is enabled to safely converge without collision without providing the adjacent vehicle approach prohibition region 21.

In the example shown in FIG. 8, suppose that a non-busy MT 3, which is closest to the converging vehicle A, is assigned as converging MT 3-2 to the converging vehicle A which is about to converge from the branch line 2 onto the main line 1. In addition, suppose that in this case the speed of motion of the converging vehicle A is lower than that of the MT 3-2.

In this case, the driving management computer 7 sets the MT 3-2 as variable MT 32 and varies the variable MT 32 in the direction of arrow 52, in FIG. 8, in conformity to the converging vehicle A so that the convergence point 4 may become the point of change. Thus, the converging vehicle A is accelerated in pursuit of the variable MT 32 and converges onto the convergence point 4 in pursuit of the variable MT 32.

In the example of FIG. 8, suppose that a non-busy MT 3, which is closest to a converging vehicle B following the converging vehicle A is assigned as converging MT 3-4 to the converging vehicle B. In addition, suppose that the speed of the converging vehicle B is much higher than that of MT 3-4.

In this case, the driving management computer 7 sets the MT 3-4 as variable MT 34 and varies the variable MT 34 in the direction of arrow 54 in FIG. 8 in conformity to the converging vehicle B so that the convergence point 4 may become the point of change. Thus, the converging vehicle B is accelerated in pursuit of the variable MT 34 and converges onto the convergence point 4 in pursuit of the variable MT 34.

In the present embodiment, the two methods can be adopted as basic methods for varying the MT. In the first method, the interval of generation of MTs is varied. In the second method, the inclination of the MT (i.e. the speed of movement of the MT) is varied. By combining these methods, the MT can be variously changed.

The simplest examples of application of these two methods will now be described with reference to FIGS. 9 and 10.

Figure 9:
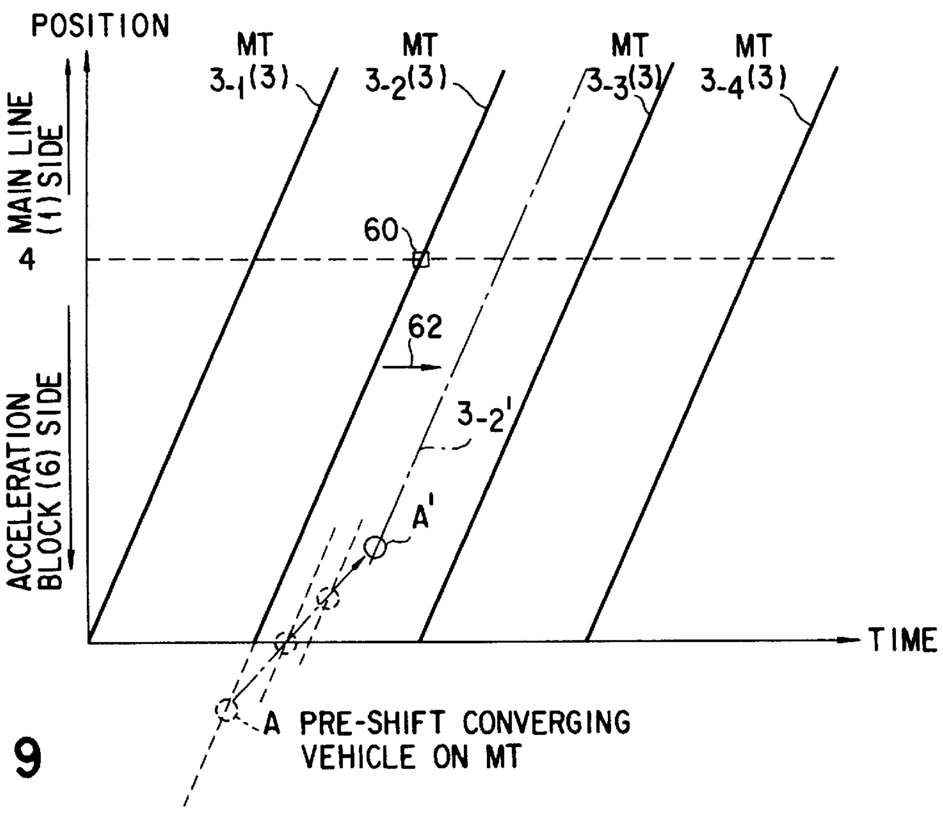
FIG. 9 illustrates an example of an MT control wherein intervals for generation of MTs are varied.

FIG. 9 shows an example wherein the interval of generation of MTs is varied. An MT 3 is assigned as converging MT 3-2 to the converging vehicle A which is about to converge onto main line 1 from branch line 2. However, if the converging vehicle A is run in pursuit of the converging MT 3-2, it is expected that a non-MT-controlled to-be-converged vehicle 60 will be present on the convergence point 4 at a timing at which the converging vehicle A will converge upon the convergence point 4.

In this case, the driving management computer 7 shifts the converging MT 3-2, assigned to the converging vehicle A, in the direction of arrow 62 so that it will change to the converging MT 3-2'. The computer 7 causes the converging vehicle A, which has been running in accordance with the MT 3-2, to run in pursuit of the shifted MT 3-2', i.e. the MT 3-2' in which the interval of generation of MTs has been changed. The converging vehicle A, which runs in pursuit of the shifted MT 3-2', is expressed as "converging vehicle A'" in order to distinguish it from the converging vehicle running in pursuit of the pre-shift MT 3-2'. Since the converging vehicle A' is caused to run in pursuit of the shifted MT 3-2', the converging vehicle A' is led to the convergence point 4 at a timing at which the non-MT-controlled to-be-converged vehicle 60 will not come to the convergence point 4. In other words, the non-MT-controlled to-be-converged vehicle 60 can be excluded from the convergence point 4 at a timing at which the converging vehicle A' will come to the convergence point 4.

Figure 10:
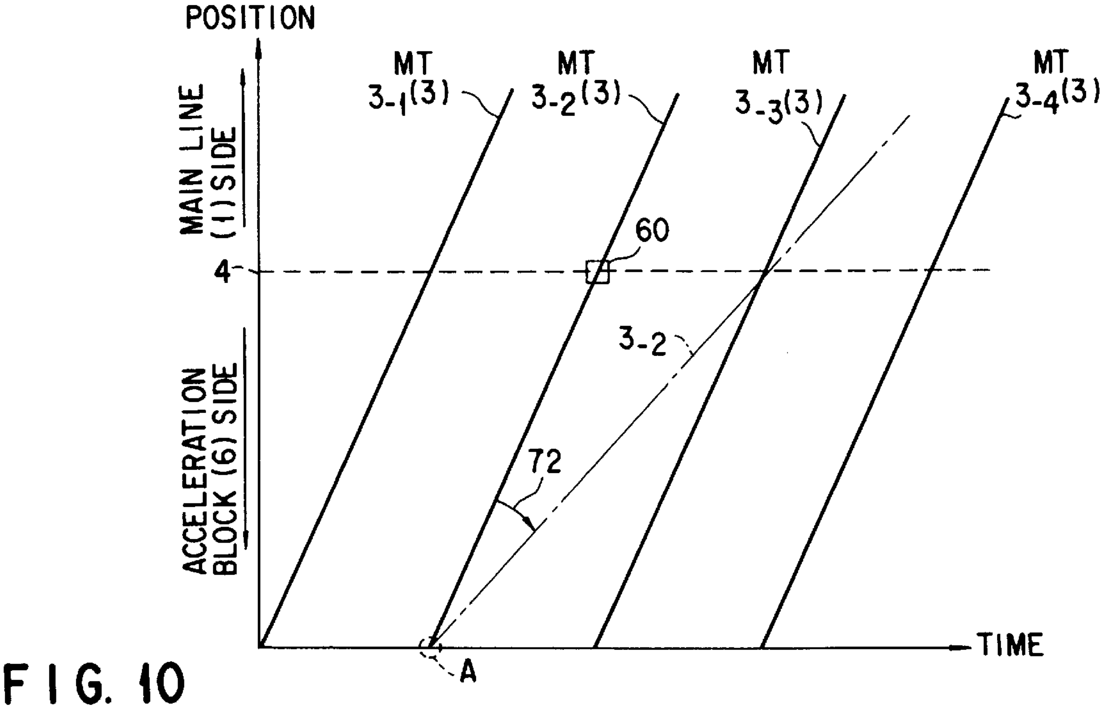
FIG. 10 illustrates an example of an MT control wherein the inclination of MTs is varied.

FIG. 10 shows an example in which the inclination of the MT is varied. Like in the example of FIG. 9, the converging MT 3-2 is assigned to the converging vehicle A which is about to converge onto main line 1 from branch line 2, and it is expected that if the converging vehicle A is run in pursuit of the converging MT 3-2, the non-MT-controlled to-be-converged vehicle 60 will be present on the convergence point 4 at a timing at which the converging vehicle A will converge upon the convergence point 4.

In this case, the driving management computer 7 shifts the converging MT 3-2, assigned to the converging vehicle A, in the direction of arrow 72 so that it will change to the converging MT 3-2". The computer 7 causes the converging vehicle A to run in pursuit of the shifted MT 3-2", with a timing of convergence being displaced. Thus, the non-MT-controlled to-be-converged vehicle 60 can be excluded from the convergence point 4 at a timing at which the converging vehicle A will come to the convergence point 4.

The degree of variation in the interval of generation of MTs or in the inclination (speed of movement) of MTs may be determined on the basis of the vehicle run conditions on the main line 1, such as a traffic volume of vehicles running on the main line 1, a vehicle speed, a road condition of main line 1, and vehicle performance.

It has been described above that the to-be-converged vehicle can be excluded from the convergence point at a timing at which the converging vehicle will come to the convergence point, by varying the interval of generation of converging MTs assigned to the converging vehicle or the inclination (speed of movement) of the MTs. However, the to-be-converged vehicle can also be excluded from the convergence point at a timing at which the converging vehicle will come to the convergence point, by varying the interval of generation of to-be-converged MTs assigned to the to-be-converged vehicle running on the main line, onto which the converging vehicle is to converge, or the inclination (speed of movement) of the to-be-converged MTs. It is also possible to vary the interval of generation or the inclination of both the converging MTs and to-be-converged MTs.

As has been described above, according to the present invention, the adjacent vehicle approach prohibition region is set with reference to the to-be-converged MT on the main line, which corresponds to the converging MT assigned to the converging vehicle, the to-be-converged MT is accelerated or decelerated, and thus the to-be-converged vehicle running on the main line, onto which the converging vehicle is to converge, is excluded from the adjacent vehicle approach prohibition region. Accordingly, the vehicle can enter and converge upon the main line from the branch line in the state in which a safe vehicle interval is maintained between the to-be-converged vehicles running before and after the to-be-converged MTs. Compared to the conventional MT method, the safety and reliability is remarkably enhanced. The advantage of excluding the incoming vehicle from the adjacent vehicle approach prohibition region is obtained not only with respect to the convergence from the branch line to the main line but also with respect to the divergence from the main line to the branch line.

Furthermore, according to the present invention, at least one of the interval of generation and the speed of movement of at least one of converging MTs of the converging vehicle and to-be-converged MTs of the to-be-converged vehicle, onto which the converging vehicle is to converge, is varied in accordance with the vehicle run condition on the main line. Thus, the safety of the converging vehicle is ensured and traffic disorders such as traffic accidents and traffic snarl can be prevented in the diverging/converging region.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A running vehicle control method using a moving target method, for controlling a plurality of vehicles running on a road including a main line and a branch line, comprising:

assigning a moving target, on the main line, for a converging vehicle which is about to enter and converge onto the main line from the branch line;

setting an adjacent vehicle approach prohibition region in front of and behind the assigned moving target;

varying a length of said approach prohibition region in accordance with a running condition of a to-be-converged vehicle running on the main line; and one of accelerating and decelerating the assigned moving target, when the to-be-converged vehicle, not subject to a control by the moving target method, running on the main line has entered the adjacent vehicle approach prohibition region, such that the to-be-converged vehicle is excluded from the adjacent vehicle approach prohibition region.

2. The method according to claim 1, wherein said varying step includes the step of varying a length of said approach prohibition region in accordance with at least one of a vehicle traffic volume, a vehicle speed, a road condition, and a vehicle performance.

3. A running vehicle control method using a moving target method, for controlling a plurality of vehicles running on a road including a main line and a branch line, comprising:

assigning a converging moving target, on the main line, for a converging vehicle which is about to enter and converge onto the main line from the branch line;

assigning a to-be-converged moving target to a to-be-converged vehicle running on the main line; and varying, based on a vehicle running condition on the main line, at least one of an interval of generation of at least one of the assigned converging moving target and the assigned to-be-converged moving target, and a speed of movement of at least one of the assigned converging moving target and the assigned to-be-converged moving target to prevent the converging vehicle from coinciding with the to-be-converged vehicle at a point of convergence.

4. The method according to claim 3, wherein said varying step includes the step of varying said at least one of the interval of generation of the assigned converging moving target and the speed of movement of the assigned converging moving target in accordance with at least one of a vehicle traffic volume, a vehicle speed, a road condition, and a vehicle performance.

5. The method according to claim 3, wherein said varying step includes the step of varying said at least one of the interval of generation of the assigned to-be-converged moving target and the speed of movement of the assigned to-be-converged moving target in accordance with at least one of a vehicle traffic volume, a vehicle speed, a road condition, and a vehicle performance.

6. A running vehicle control method using a moving target method, for controlling a plurality of vehicles running on a road including a main line and a branch line, comprising:

assigning a first moving target, on the main line, for a converging vehicle which is about to enter and converge onto the main line from the branch line;

setting an adjacent vehicle approach prohibition region in front of and behind the assigned first moving target;

varying a length of said approach prohibition region in accordance with a running condition of a to-be-converged vehicle running on the main line; and alternatively performing either one of the following steps, one of accelerating and decelerating a second moving target assigned to a first to-be-converged vehicle running on the main line, when the first to-be-converged vehicle, subject to a control by the moving target method, has entered the adjacent vehicle approach prohibition region, such that the first to-be-converged vehicle is excluded from the adjacent vehicle approach prohibition region; and one of accelerating and decelerating the assigned first moving target, when a second to-be-converged vehicle running on the main line, not subject to a control by the moving target method, has entered the adjacent vehicle approach prohibition region, such that the second to-be-converged vehicle is excluded from the adjacent vehicle approach prohibition region.

7. The method according to claim 6, wherein said setting step includes the step of varying the length of said approach prohibition region in accordance with at least one of a vehicle traffic volume, a vehicle speed, a road condition, and a vehicle performance.

* * * * *